US009726095B2

(12) United States Patent
Yoshizaki et al.

(10) Patent No.: US 9,726,095 B2
(45) Date of Patent: Aug. 8, 2017

(54) ENGINE DRIVEN WORKING MACHINE

(71) Applicants: YAMABIKO CORPORATION, Ohme-shi, Tokyo (JP); OPPAMA INDUSTRY co., ltd, Yokosuka-shi, Kanagawa (JP)

(72) Inventors: Takuo Yoshizaki, Kokubunji (JP); Yuichi Tsuyuki, Yokosuka (JP); Toshiyuki Takano, Yokosuka (JP); Masao Iwata, Yokosuka (JP); Kiyoshige Enomoto, Yokosuka (JP)

(73) Assignees: YAMIBIKO CORPORATION, Ohme-Shi, Tokyo (JP); OPPAMA INDUSTRY CO., LTD., Yokosuka-Shi, Kanagawa (JP)

( * ) Notice: Subject to any disclaimer, the term of this patent is extended or adjusted under 35 U.S.C. 154(b) by 87 days.

(21) Appl. No.: 14/881,811

(22) Filed: Oct. 13, 2015

(65) Prior Publication Data

US 2016/0123256 A1 May 5, 2016

(30) Foreign Application Priority Data

Oct. 14, 2014 (JP) ................................ 2014-209964

(51) Int. Cl.

| | |
|---|---|
| ***B60W 10/06*** | (2006.01) |
| ***F02D 41/02*** | (2006.01) |
| ***F02D 41/06*** | (2006.01) |
| ***F02D 31/00*** | (2006.01) |
| ***F02B 63/02*** | (2006.01) |
| ***F02D 35/00*** | (2006.01) |
| *F02P 5/15* | (2006.01) |
| *F02N 3/02* | (2006.01) |

(52) U.S. Cl.

CPC .......... *F02D 41/0215* (2013.01); *F02B 63/02* (2013.01); *F02D 31/003* (2013.01); *F02D 35/0007* (2013.01); *F02D 41/022* (2013.01); *F02D 41/064* (2013.01); *F02D 2400/06* (2013.01); *F02N 3/02* (2013.01); *F02P 5/1504* (2013.01); *F02P 5/1508* (2013.01)

(58) Field of Classification Search

CPC .................................................... B60W 10/06

See application file for complete search history.

(56) References Cited

U.S. PATENT DOCUMENTS 2,597,606 A * 5/1952 Winkler .................. F02M 1/10 123/179.15
4,336,778 A * 6/1982 Howard ................. B60K 28/00 123/198 D (Continued)

OTHER PUBLICATIONS

European Search Report issued in European Patent Application No. 15189324.5 mailed Mar. 3, 2016.

*Primary Examiner* — Tisha Lewis
(74) *Attorney, Agent, or Firm* — Baker & Hostetler LLP

(57) ABSTRACT

An engine-driven working machine including a controller by which a time period until the rotation speed limitation mode is canceled can be shortened. After a throttle valve is moved to a fully-closed position by an operation to allow the engine to finish the fast idling state and while the engine is transited to an idling state, the controller cancels the rotation speed limitation mode by detecting an event in which a cycle period of rotation speed variations of the engine is longer than a cycle period of rotation speed variation in the fast idling state.

8 Claims, 4 Drawing Sheets

(56) References Cited

U.S. PATENT DOCUMENTS

| | | | | |
|---|---|---|---|---|
| 4,753,012 | A * | 6/1988 | Schurr | B27B 17/083 188/77 R |
| 5,445,121 | A * | 8/1995 | Kai | F02D 17/04 123/198 DC |
| 7,171,942 | B2 * | 2/2007 | Nickel | F02D 31/001 123/335 |
| 7,699,039 | B2 | 4/2010 | Carlsson et al. | |
| 8,469,001 | B2 * | 6/2013 | Yoshizaki | F02D 11/04 123/198 DC |
| 2006/0086337 | A1 | 4/2006 | Nickel | |
| 2010/0012084 | A1 | 1/2010 | Andersson et al. | |
| 2010/0147544 | A1 | 6/2010 | Yoshizaki et al. | |
| 2012/0193112 | A1 | 8/2012 | Gwosdz et al. | |
| 2013/0151126 | A1 | 6/2013 | Harrer et al. | |
| 2014/0034011 | A1 | 2/2014 | Gegg et al. | |
| 2014/0230787 | A1 | 8/2014 | Mezaki et al. | |

* cited by examiner

ENGINE DRIVEN WORKING MACHINE

TECHNICAL FIELD

The present invention relates to an engine-driven working machine.

BACKGROUND ART

An engine-driven working machine, such as a chain saw, a bush cutter, and a hedge trimmer, is known.

A working machine has an engine, an actuating part (for example, a chain with cutting edges in a chain saw), and a centrifugal clutch disposed between the engine and the actuating part. The centrifugal clutch is configured to connect the engine with the actuating part when a rotation speed of the engine is higher than a predetermined clutch-in rotation speed so that rotations of the engine are transmitted to the actuating part.

The engine of the working machine is designed so that when a throttle valve of a carburetor provided in the engine is in a fully-closed position, the engine rotates stably at a rotation speed which is lower than the clutch-in rotation speed. This state is referred to as an idling state.

When the engine is started, especially in an insufficient warming-up state, in order to stabilize starting and running operations of the engine, the engine is generally started with the throttle valve of the carburetor in a half-opened position to increase an amount of air supplied to the engine and runs while the throttle valve is maintained in the half-opened position. This state is referred to as a fast idling state.

Generally, when the engine is started, a brake for the actuating part is actuated in order to prevent the actuating part from being actuated unintentionally. In the fast idling state, since the rotation speed of the engine may become higher than the clutch-in rotation speed due to the throttle valve in the half-opened state, the brake is preferably used for safety. However, if the engine is started without using the brake in the fast idling state, the actuating part could be actuated at the starting. In order to enable the starting operation to be in safe even in this situation, the engine is provided with a controller which can operate in a rotation speed limitation mode in which the rotation speed of the engine is prevented from becoming higher than the clutch-in rotation speed after the starting operation.

The controller operates in the rotation speed limitation mode from the starting of the engine. Concretely, the controller detects the rotation speed of the engine, and when excess of the rotation speed of the engine over the clutch-in rotation speed is expected (when the rotation speed of the engine exceeds a predetermined rotation speed which is lower than the clutch-in rotation speed), the controller prevents rotation speed of the engine from becoming higher than the clutch-in rotation speed by performing a misfiring cycle which makes an ignition device of the engine inoperative or controlling an ignition timing of the ignition device.

On the other hand, when the operation of the controller is maintained in the rotation speed limitation mode, even if the throttle valve is moved to a fully-opened position, the rotation speed of the engine is prevented from becoming higher than the clutch-in rotation speed so that the centrifugal clutch is not operated and the rotations of the engine are not transmitted to the actuating part. Therefore, in order to operate the working machine, it is necessary to cancel the rotation speed limitation mode at an appropriate timing.

Providing a mechanical switch in the throttle valve is considered as one means so that when the mechanical switch detects an operation of the throttle valve, the rotation speed limitation mode is canceled. However, detecting the operation of the throttle valve without providing the mechanical switch is preferable due to possibility of malfunction of the mechanical switch and an increasing cost.

In a technology disclosed in the Patent Publication 1 indicated below, the rotation speed limitation mode is canceled by detecting a state of the engine when the throttle valve is moved to a fully-opened state.

In a technology disclosed in the Patent Publication 2 indicated below, after the throttle valve is moved to a fully-closed position to finish the fast idling state, the rotation speed limitation mode is canceled by detecting a matter that the engine becomes an idling state, that is, by detecting a matter that a time enough to decrease the rotation speed has passed.

PRIOR ART PUBLICATION

Patent Publication 1: U.S. Patent Application Publication No. 2012/0193112

Patent Publication 2: U.S. Pat. No. 7,699,039

SUMMARY OF THE INVENTION

Problem to be Solved by the Invention

In the technology disclosed in the Patent Publication 2, after the throttle valve is moved to the fully-closed position to finish the fast idling state, it takes a long time until the rotation speed of the engine actually decreases so that the engine becomes in a stable idling state, namely, it takes a long time to cancel the rotation speed limitation mode. If an operator moves the throttle lever to a fully-opened position because he/she cannot wait for the cancelation of the rotation speed limitation mode, the rotation speed limitation mode would be maintained effectively so that a situation in which he/she cannot operate the working machine continues.

Thus, an object of the present invention is to provide an engine-driven working machine in which after the throttle valve is moved to the fully-closed position to finish the fast idling state, a time period until the rotation speed limitation mode is canceled can be shortened more than that in the art disclosed in the Patent Publication 2, while safety is surely maintained.

Means for Solving the Problem

In order to achieve the present invention, the present inventors have noted changes in a cycle period of rotation speed variations of the engine from a time when the throttle valve is moved to the fully-closed position to finish the fast idling state to a time of transiting the idling state and can make the present invention.

In order to achieve the aforementioned object, an engine-driven working machine according to the present invention comprises: an engine; an actuating part driven by the engine; a centrifugal clutch disposed between the engine and the actuating part; and a controller detecting a rotation speed of the engine and detecting the rotation speed, wherein when the rotation speed of the engine is higher than a predetermined clutch-in rotation speed, the centrifugal clutch connects the engine with the actuating part so as to transmit rotations of the engine to the actuating part, wherein in a fast idling state in which the engine is operated while a throttle valve of a carburetor of the engine is maintained in a half-opened position, the controller is operated from starting of the engine in a rotation speed limitation mode in which the engine is prevented from rotating at a rotation speed that is higher than the clutch-in rotation speed, and wherein after the throttle valve is moved to a fully-closed position by an operator's operation to finish the fast idling state and while the engine is transited to an idling state, the controller cancels the rotational limitation mode by detecting an event that a cycle period of rotation speed variations of the engine is longer than a cycle period of rotation speed variations in the fast idling state.

In this working machine, after the throttle valve is moved to the fully-closed position to finishes the fast idling state and while the engine is transited to the idling state, that is, before the engine becomes in the idling state, the controller cancels the rotation speed limitation mode by detecting an event that the cycle period of the rotation speed variations of the engine is longer than the cycle period of the rotation speed variations in the fast idling state. Thus, after the throttle valve is moved to the fully-closed position, a time period until the rotation speed limitation mode is canceled can be shortened more than that in the art disclosed in the Patent Publication 2, while safety is surely maintained.

In an embodiment of the present invention, the event that the cycle period of the rotation speed variations of the engine while the engine is transited to the idling state is longer than the cycle period of the rotation speed variations in the fast idling state may be determined by an event that a time period between increased peaks of the rotation speed variations of the engine is longer than a predetermined time period, by an event that a time period between bottom peaks of the rotation speed variations of the engine is longer than a predetermined time period, by an event that a number of times of causing a predetermined increase and/or a predetermined decrease of the rotation speed of the engine during a predetermined time period is less than a predetermined number of times, by an event that any increased peak, any bottom peaks, any predetermined increase, and any predetermined decrease of the rotation speed variations of the engine is not detected during a predetermined time period, or by any other appropriate ways.

In an embodiment of the present invention, preferably, in the rotation speed limitation mode, the controller prevents the engine from rotating at a rotation speed which is higher than the clutch-in rotation speed by appropriately causing a misfire cycle in the engine. More preferably, the controller performs advance angle control at igniting of an ignition device of the engine.

In an embodiment of the present invention, preferably, the operator's operation of moving the throttle valve to the fully-closed position includes an operation of actuating the throttle lever and then returning the throttle lever.

According to the engine-driven working machine according to the present invention, after the throttle valve is move to the fully-closed position to finish the fast idling state, a time period until the rotation speed limitation mode is canceled can be shortened than that in the art disclosed in the Patent Publication 2, while safety is surely maintained.

BRIEF DESCRIPTION OF THE DRAWINGS

FIG. 3(*b*) is a schematic view of a throttle valve and a choke valve.

FIG. 3(*c*) is a schematic view of a throttle valve and a choke valve.

DESCRIPTION OF EMBODIMENTS

Figure 1:
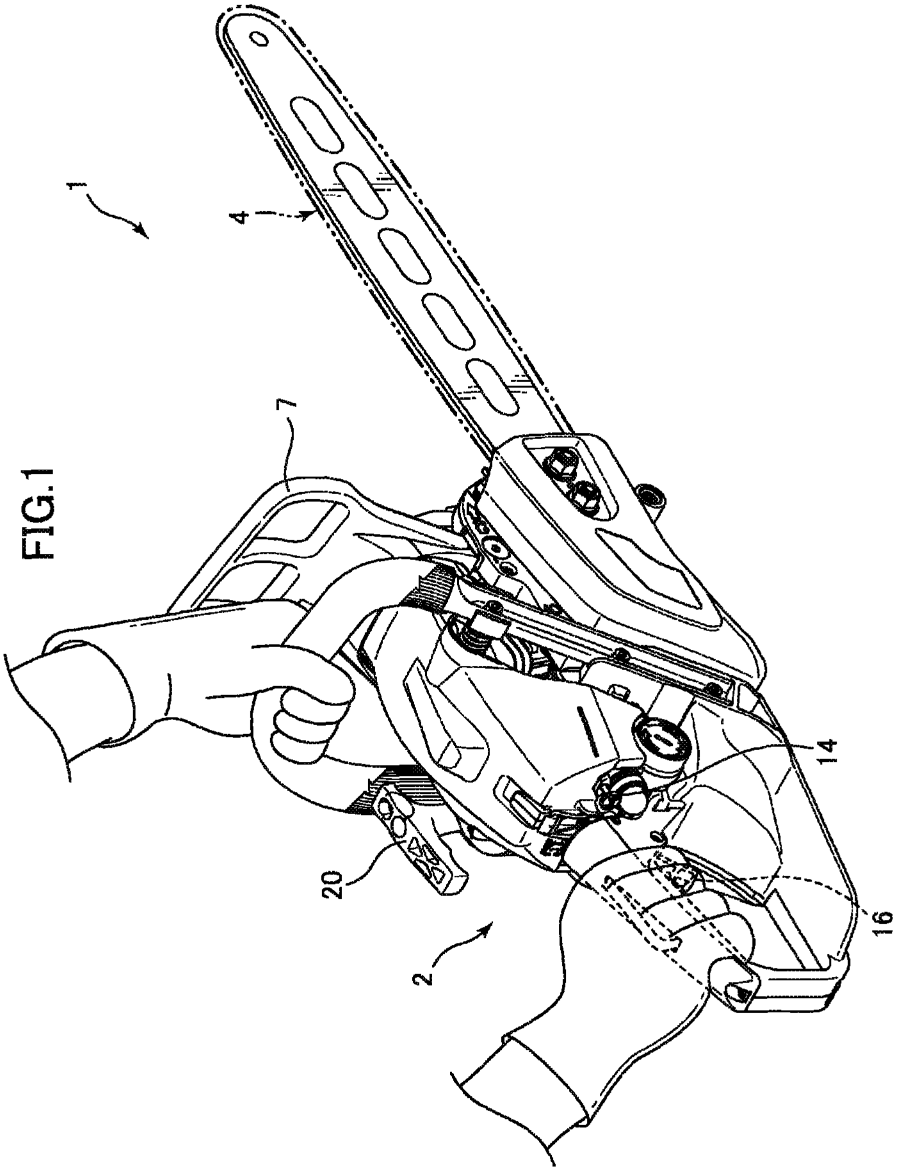
FIG. 1 is a perspective view of a chain saw.

Referring to the drawings, a chain saw which is an engine-driven working machine according to the present invention will be explained. As shown in FIG. 1, a chain saw 1 has an engine 2, a chain 4 with cutting edges which is an actuating part driven by the engine 2, and a centrifugal clutch 6 (shown in FIG. 2) disposed between the engine 2 and the actuating part 4. The centrifugal clutch 6 connects the engine 2 with the chain 4 with cutting edges to transmit rotations of the engine 2 to the chain 4 with cutting edges when a rotation speed of the engine 2 is higher than a predetermined clutch-in rotation speed. The chain saw 1 also has a brake lever 7 which actuates a brake (not shown) to stop an output side of the centrifugal clutch 6. Since the engine 2, the chain 4 with cutting edges, the centrifugal clutch 6, and other structures in the chain saw 1 are those which are conventionally known, detail explanations thereof are omitted.

Figure 2:
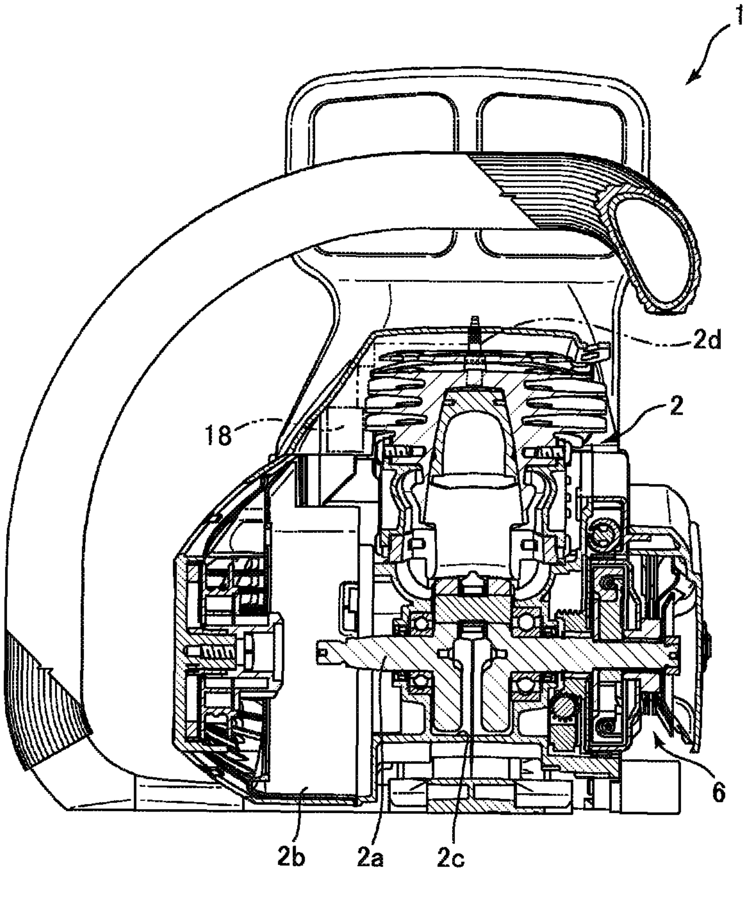
FIG. 2 is a cross-sectional view of a driving part of the chain saw.
Figure 3A:
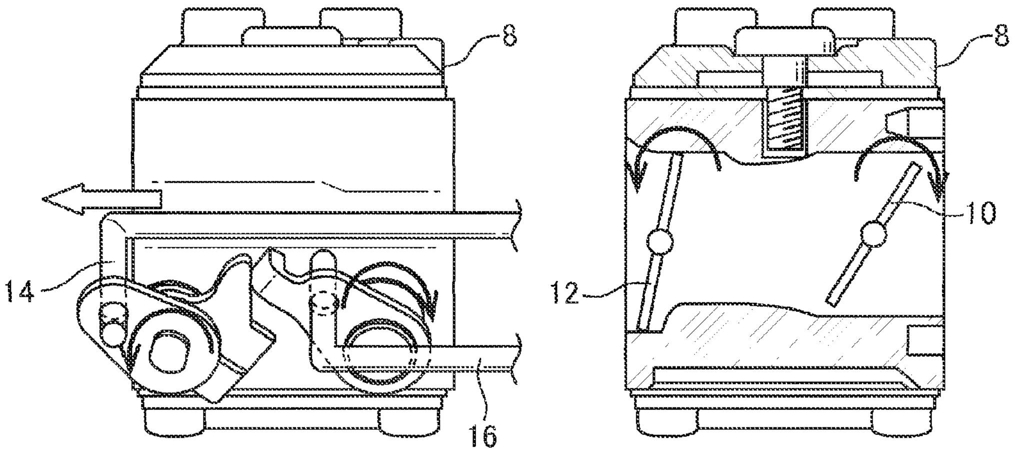
FIG. 3(*a*) is a schematic view of a throttle valve and a choke valve.
Figure 3B:
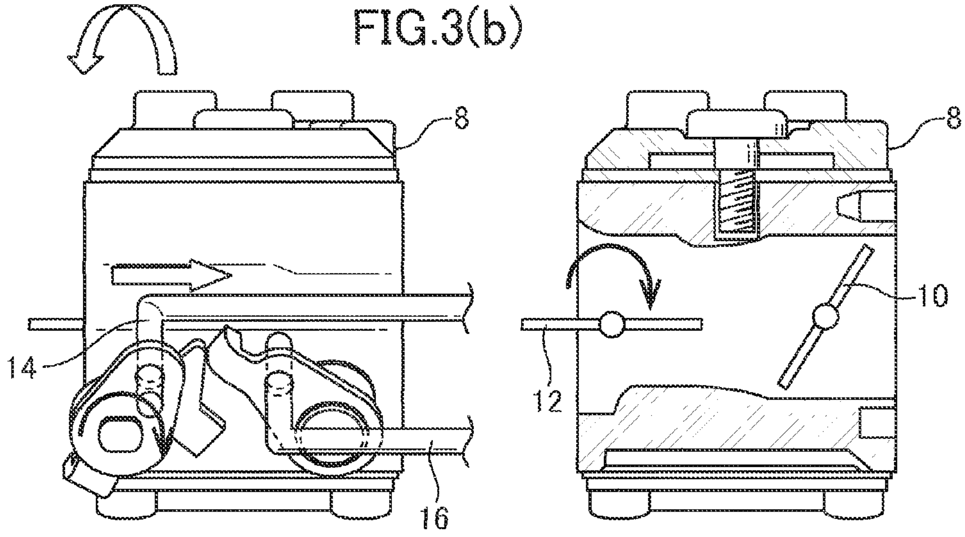
Figure 3C:
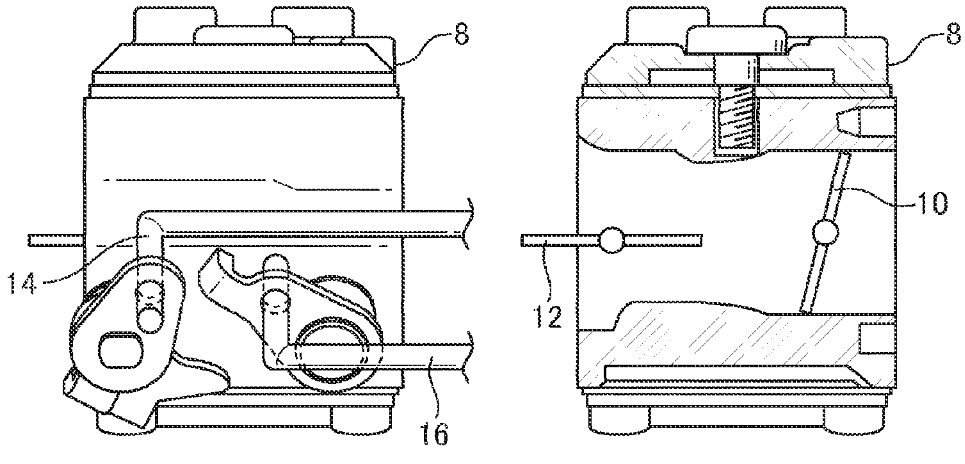

As shown in FIG. 2, the engine 2 is preferably a two-stroke gasoline engine, and as shown in FIG. 3, a carburetor 8 provided in the engine 2 has a throttle valve 10 and a choke valve 12. The throttle valve 10 and the choke valve 12 are those which are conventionally known. The throttle valve 10 and the choke valve 12 may be configured to be moved independently or moved together so as to perform a specific operation. In the present embodiment, when a choke lever 14 (shown in FIG. 1) is actuated, the choke valve 12 is configured to be moved from a fully-opened position to a fully-closed position, while the throttle valve 10 is configured to be moved from a fully-closed position to a half-opened position, as shown in FIG. 3(*a*). Further, when the choke lever 14 is returned, the choke valve 12 is configured to be moved from the fully-closed position to the fully-opened position, while the throttle valve 10 is configured to be maintained in the half-opened position, as shown in FIG. 3(*b*). Further, the throttle valve 10 is configured to return from the half-opened position to the fully-closed position by actuating and then returning a throttle lever 16 (shown in FIG. 1), as shown in FIG. 3(*c*).

The engine 2 also has a controller 18 which detects a rotation speed of the engine 2 and controls the rotation speed. In the present embodiment, the rotation speed of the engine 2 is detected by detecting a magnet 2*b* attached to a crankshaft 2*a* of the engine 2 (or integrated with a flywheel), as shown in FIG. 2 and treating the detected magnet 2*b* with a program. For example, a time period required for one rotation of the crankshaft 2*a* of the engine 2 (or a crankshaft cycle period) is detected and the rotation speed is calculated based on the time period.

Next, a method of starting the engine 2 will be explained.

By actuating the choke lever 14, the choke valve 12 is moved from the fully-opened position to the fully-closed position, while the throttle valve 10 is moved to the half-opened position, as shown in FIG. 3(*a*). This is called as a fast idling start and is especially effective to a cold-state start when the engine 2 is cold. Then, the engine 2 is started by pulling a recoil rope 20 (shown in FIG. 1). Since the choke valve 12 is in the fully-closed position, when a pressure inside of a crankcase 2*c* (shown in FIG. 2) becomes negative, a relatively large amount of fuel is supplied so that the engine 2 becomes in an easily-combusting state. A matter that the engine 2 becomes in a combustible state can be found when a first explosion is heard after the recoil rope 20 is pulled several times.

Then, the choke lever 14 is returned so that the choke valve 12 is moved to the fully-opened position, while the throttle valve 10 is maintained in the half-opened position, as shown in FIG. 3(*b*). Then, by pulling the recoil rope 20, the engine 20 is started. Since the throttle valve 10 is in the half-opened position, the engine 2 is operated in a fast idling state.

In the fast idling state in which the engine 2 is rotated while the throttle valve 10 of the engine 2 is maintained in the half-opened position, the controller 18 is operated from the starting of the engine 2 in a rotation speed limitation mode in which the engine 2 is prevented from rotating at a rotation speed which is higher than the clutch-in rotation speed. For example, in the rotation speed limitation mode, the controller 18 properly causes misfiring cycles in the engine 2 so as to prevent the engine 2 from rotating at a rotation speed which is higher than the clutch-in rotation speed. Concretely, when the rotation speed of the engine 2 exceeds a predetermined rotation speed (for example, 3200 rpm,) which is lower than the clutch-in rotation speed, a misfiring cycle is caused to disable ignition plugs 2*d* (shown in FIG. 2) so that an increase of the rotation speed of the engine 2 is prevented.

In the rotation speed limitation mode, the controller 18 is preferably performs advance angle control of an ignition timing of an ignition device 2*d* of the engine 2. By advancing an angle of the ignition timing of the ignition device 2*d* than usual, the engine 2 can be prevented from stopping when the misfiring cycle is caused. Further, up and down variations of the rotation speed of the engine 2, which will be explained below, can be easily caused in the fast idling state.

Figure 4:
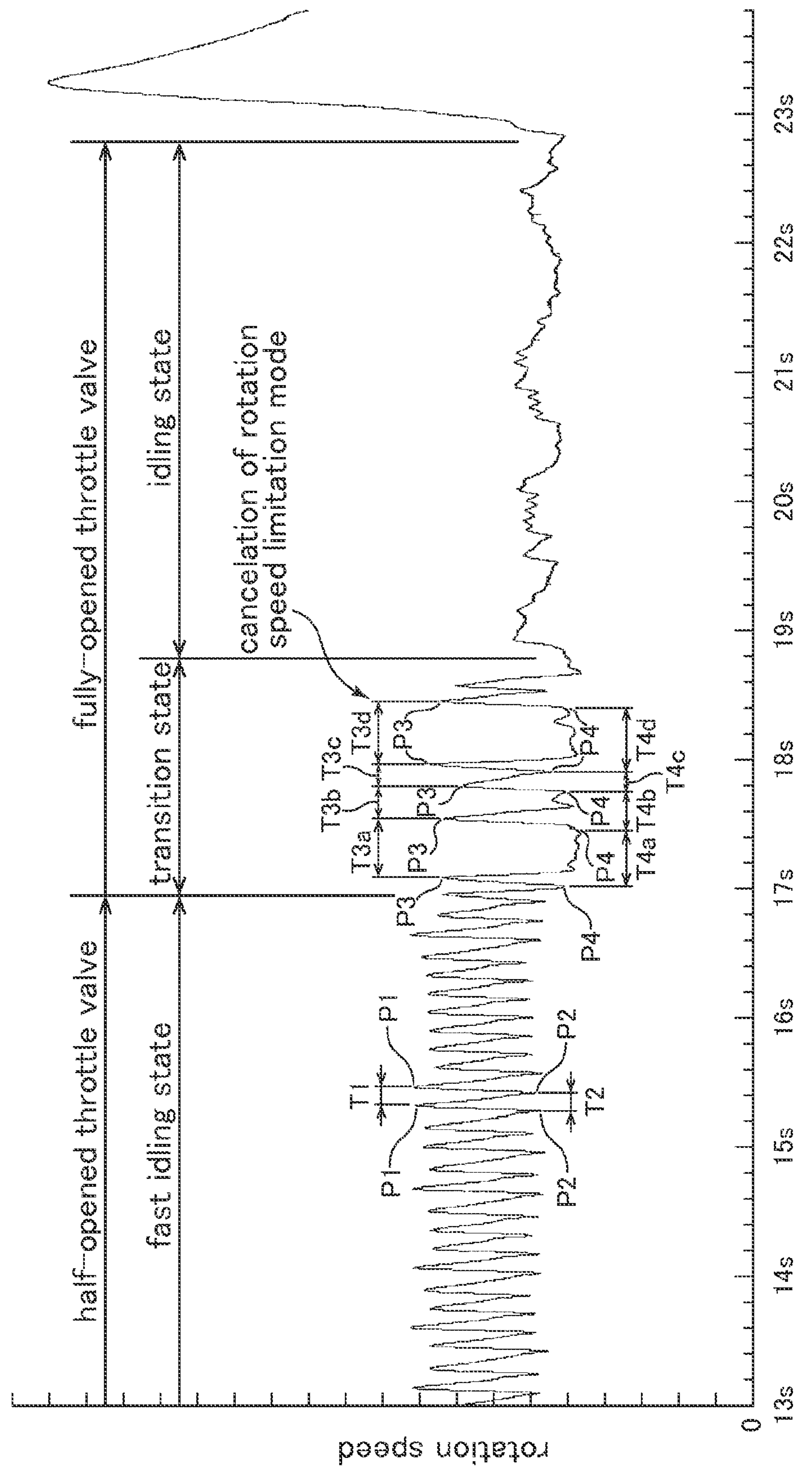
FIG. 4 is a diagram showing variations in an engine rotation speed when the throttle valve is moved from a half-opened position to a fully-closed position.

Next, canceling the rotation speed limitation mode will be explained. FIG. 4 shows changes in the rotation speed of the engine when the throttle valve 10 is moved from the half-opened position to the fully-closed position.

When the throttle valve 10 is in the half-opened position, the engine 2 is in the fast idling state. Since the controller 18 is operated in the rotation speed limitation mode, when the rotation speed of the engine 2 is increased so as to exceed the predetermined rotation speed which is lower than the clutch-in rotation speed, the controller 18 causes the misfiring cycle of the engine 2 so that the rotation speed of the engine 2 decreases. Namely, an increase and a decrease of the rotation speed of the engine 2 are repeated, based on which a cycle period of rotation speed variations is defined. In FIG. 4, examples of locations where the misfiring cycle was caused are indicated by a character P1. The rotation speed of the engine 2 in the fast idling state is about between 3000 rpm and 4500 rpm.

The cycle period of the rotation speed variations of the engine 2 in the fast idling state is, for example, a time period T1 between top or increased peaks of the rotation speed. The increased peak is, for example, a state immediately before a detected rotation speed (which means, hereinafter, a rotation speed calculated from a cycle period of the crankshaft) is greatly decreased by more than a predetermined amount of rotation speed (for example, 300 rpm), and correspond to the misfiring cycle locations indicated by P1. The increased peaks P1 appear relatively regularly at high frequency.

Alternatively, the cycle period of the rotation speed variations of the engine 2 in the fast idling state may be a time period T2 between bottom or decreased peaks of the rotation speed. The bottom peak P2 is, for example, a state immediately before a detected rotation speed is greatly increased by more than a predetermined amount of rotation speed (for example, 300 rpm). The bottom peaks P2 appear relatively regularly at high frequency.

Alternatively, the cycle period of the rotation speed variations of the engine 2 in the fast idling state may be defined from a number of times of increases in the rotation speed, a number of times of decreases in the rotation speed, or a number of times of increases and decreases in the rotation speed during a predetermined time period. For example, the number of times of increases is a number of times when the detected rotation speed increases by a predetermined amount of rotation speed (for example, 300 rpm), and the number of times of decreases is a number of times when the detected rotation speed decreases by more than a predetermined amount of rotation speed (for example, 300 rpm).

After the throttle valve is moved to the fully-closed position, the engine 2 is in a transition state in which the engine 2 transits to the idling state. Also in this state, an increase and a decrease of the rotation speed of the engine 2 tend to be repeated, but a cycle period of the rotation speed variations, which is longer than the cycle period of the rotation speed variations in the fast idling state, starts to be caused. In other words, a state is caused in which after a relatively low rotation speed continues, the rotation speed is suddenly increased to cause the misfiring cycle so that the rotation speed is suddenly decreased. As a result, a frequency of causing the increased peaks and the bottom peaks become less than that in the fast idling state.

A cycle period of the rotation speed variations of the engine 2 in the transition state is, for example, a time period from T3*a* to T3*d* between top or increased peaks P3 of the rotation speed. The increased peak P3 is, for example, a state immediately before a detected rotation speed is decreased by more than a predetermined amount of rotation speed (for example, 300 rpm). A frequency of causing the increased peaks P3 is less than that in the fast idling state.

Alternatively, the cycle period of the rotation speed variations of the engine 2 in the transition state may be, for example, a time period T4 between bottom or decreased peaks P4 of the rotation speed. The bottom peak P4 is, for example, a state immediately before a detected rotation speed is increased by more than a predetermined amount of rotation speed (for example, 300 rpm). A frequency of causing the bottom peaks P4 is less than that in the fast idling state.

Alternatively, the cycle period of the rotation speed variations of the engine 2 in the transition state may be defined from a number of times of increases in the rotation speed, a number of times of decreases in the rotation speed, or a number of times of increases and decreases in the rotation speed during a predetermined time period. For example, the number of times of increases is a number of times when the detected rotation speed increases by more than a predetermined amount of rotation speed (for example, 300 rpm), and a number of times of decreases is a number of times when the detected rotation speed decreases by more than a predetermined amount of rotation speed (for example, 300 rpm).

Then, the engine 2 becomes in the idling state. The rotation speed of the engine 2 varies within a rotation speed range which is lower than the rotation speed in the fast idling state. The rotation speed in the idling state is about 2500-4000 rpm. Further, an increased peak and a bottom peak of the rotation speed of the engine 2 are not clearer than those in the fast idling state and in the transition state.

The present inventors have noted the above-stated changes in the cycle period of the rotation speed changes (the variations of the rotation speed) of the engine 2, and defined a timing when the controller 18 cancels the rotation speed limitation mode. Specifically, after the throttle valve 10 is moved to the fully-closed position by an operator's operation to finish the idling state and while the engine 2 is transited to the idling state, the timing is defined after a state in which the cycle period of the rotation speed variations of the engine 2 is longer than that in the fast idling state is detected.

Concretely, since the time periods T3*a*, T3*d* between the increased peaks P3 of the rotation speed of the engine 2 in the transition state are apparently longer than the time period T1 between the increased peaks P1 of the rotation speed of the engine 2 in the fast idling state, by determining a predetermined time period as an intermediate time period between the time period T1 and the time period T3*a*, T3*d* and by detecting that the time period T3*a*, T3*d* becomes longer than the predetermined time period, a matter that the throttle valve 10 is moved to the fully-closed position by an operator's operation can be reliably recognized. Further, while safety is surely maintained, a matter that the throttle valve 10 is moved to the fully-closed position by the operator's operation can be reliably recognized early before the engine 2 becomes in the idling state. As a result, a time period required for determining the cancelation of the rotation speed limitation mode can be shortened.

Although in FIG. 4, the rotation speed limitation mode is canceled immediately after the time period T3*d*, the rotation speed limitation mode may be canceled immediately after the time period T3*a*. When the rotation speed limitation mode is canceled immediately after the time period T3*a*, the time until the rotation speed limitation mode is canceled can be further shortened. When the rotation speed limitation mode is canceled immediately after the time period T3*d*, safety control can be enhanced. In this way, the rotation speed limitation mode may be canceled based on the second or later time period T3*d*, rather than the first time period T3*a*.

Alternatively, since the time periods T4*a*, T4*d* between the bottom peaks P4 of the rotation speed of the engine 2 in the transition state are apparently longer than the time period T2 between the bottom peaks P2 of the rotation speed of the engine 2 in the fast idling state, a predetermined time may be determined as an intermediate time between the time period T2 and the time period T4*a*, T4*d* and a matter that the time period T4*a*, T4*d* becomes longer than the predetermined time may be detected. Also in this case, a matter that throttle valve 10 is moved to the fully-closed position by an operator's operation can be surely recognized. Further, while safety is surely maintained, a matter that the throttle valve 10 is moved to the fully-closed position by an operator's operation can be surely recognized early before the engine becomes in the idling state, and as a result, a time required for determining the cancelation can be shortened.

Alternatively, the cycle period of the rotation speed variations of the engine 2 in the transition state may be obtained from a number of times of an increase in the rotation speed, a number of times of a decrease in the rotation speed, or a number of times of an increase and a decrease during a predetermined time period. Since a number of times N2 of an increase and/or an decrease of the rotation speed during the predetermined period in the transition state is apparently smaller than a number of times N1 of an increase and/or an decrease of the rotation speed during the predetermined period in the fast idling state, by determining a predetermined number of times as an intermediate number of times between the number of times N1 and N2, T3*d* and by detecting that the number of times N2 becomes smaller than the predetermined number of times, a matter that the throttle valve 10 is moved to the fully-closed position by an operator's operation can be reliably recognized. Further, while safety is surely maintained, a matter that the throttle valve 10 is moved to the fully-closed position by an operator's operation can be surely recognized early before the engine becomes in the idling state, and as a result, a time required for determining the cancelation can be shortened.

Alternatively, the cycle period of the rotation speed variations of the engine 2 in the transition state may not be directly recognized, namely, a matter that the cycle period of the rotation speed variations is at least longer than the predetermined time period may be recognized. Concretely, since the increases and the decreases in the rotation speed in the fast idling state appear relatively regularly at a high frequency, the cycle period of the rotation speed variations is relatively short. Therefore, if any increased peaks, any bottom peaks, any increases and the decreases in the rotation speed of the engine 2 are not detected during the predetermined time period which is longer than the cycle period, the fast idling state should finish, and thus a matter that the throttle valve 10 is moved to the fully-closed position by an operator's operation can be surely recognized. Further, while safety is surely maintained, a matter that the throttle valve 10 is moved to the fully-closed position by an operator's operation can be surely recognized early before the engine becomes in the idling state, and as a result, a time required for determining the cancelation can be shortened.

The operator's operation of moving the throttle valve 10 to the fully-closed position may be performed actuating and then returning the throttle lever 16, as in the above-stated embodiment, or by moving the throttle valve 10 itself to the fully-closed position.

Although the above-stated embodiments of the present invention have been explained, the present invention is not limited to the above-stated embodiments, namely, a various modifications are possible within the scope of the present invention recited in the claims. It goes without saying that such modifications are also within the scope of the present invention.

In the above-stated embodiments, although the controller 18 prevents the engine 2 from rotating at a rotation speed which is higher than the clutch-in rotation speed by properly performing the misfiring cycle in the engine 2, the controller 18 may also prevents the engine 2 from rotating at a rotation speed which is higher than the clutch-in rotation speed by delaying the ignition timing of the ignition device of the engine 2.

As described in the above-stated embodiments, the rotation speed limitation mode may be canceled by the first detection (for example, the time period T3*a*) or second or more detection (for example, the time period T3*d*) of the matter that the cycle period of the rotation speed variations of the engine is longer than the cycle period of the rotation speed variations in the fast idling state. Further, the rotation speed limitation mode may be canceled by a plurality of kinds of detections of the matter that the cycle period of the rotation speed variations of the engine is longer than the cycle period of the rotation speed variations in the fast idling state (a combination of a time period between the increased peaks, a time period between the bottom peaks, a number of times of the increase during the predetermined period, and/or a number of times of the decrease during the predetermined period). In this way, the matter that the throttle valve 10 is moved to the fully-closed position by an operator's operation can be much surely recognized so that precision of the controller 18 can be enhanced.

EXPLANATIONS OF REFERENCE NUMERALS

1: chain saw (engine-driven working machine)
2: engine
2*d*: ignition device
4: chain with cutting edges (actuating part)
6: centrifugal clutch
8: carburetor
10: throttle valve
18: controller
T1: time period between increased peaks (in fast idling state)
T2: time period between bottom peaks (in fast idling state)
T3*a*-T3*d*: time period between increased peaks (in transition state)
T4*a*-T4*d*: time period between bottom peaks (in transition state)

What is claimed:

1. An engine-driven working machine comprising:
an engine;
an actuating part driven by the engine;
a centrifugal clutch disposed between the engine and the actuating part; and
a controller detecting a rotation speed of the engine to control the rotation speed,
wherein when the rotation speed of the engine is higher than a predetermined clutch-in rotation speed, the centrifugal clutch connects the engine with the actuating part so as to transmit rotations of the engine to the actuating part,
wherein in a fast idling state in which the engine is operated while a throttle valve of a carburetor of the engine is maintained in a half-opened position, the controller is operated from starting of the engine in a rotation speed limitation mode in which the engine is prevented from rotating at a rotation speed that is higher than the clutch-in rotation speed, and
wherein after the throttle valve is moved to a fully-closed position by an operator's operation to allow the engine to finish the fast idling state and while the engine is in a transition state in which after a relatively low rotation speed continues before it is transited to an idling state, the rotation speed is suddenly increased and then suddenly decreased, the controller cancels the rotation speed limitation mode by detecting an event that a cycle period of rotation speed variations of the engine is longer than a cycle period of rotation speed variation in the fast idling state.

2. The working machine according to claim 1, wherein the event that the cycle period of the rotation speed variations of the engine while the engine is transited to the idling state is longer than the cycle period of the rotation speed variations in the fast idling state is determined by an event that a time period between increased peaks in the rotation speed variations of the engine is longer than a predetermined time period.

3. The working machine according to claim 1, wherein the event that the cycle period of the rotation speed variations of the engine while the engine is transited to the idling state is longer than the cycle period of the rotation speed variations in the fast idling state is determined by an event that a time period between bottom peaks in the rotation speed variations of the engine is longer than a predetermined time period.

4. The working machine according to claim 1, wherein the event that the cycle period of the rotation speed variations of the engine while the engine is transited to the idling state is longer than the cycle period of the rotation speed variations in the fast idling state is determined by an event that a number of times of causing a predetermined increase and/or a predetermined decrease in the rotation speed of the engine during a predetermined time period is less than a predetermined number of times.

5. The working machine according to claim 1, wherein the event that the cycle period of the rotation speed variations of the engine while the engine is transited to the idling state is longer than the cycle period of the rotation speed variations in the fast idling state is determined by an event that an increased peak, a bottom peak, a predetermined increase or a predetermined decrease in the rotation speed variations of the engine is not detected during a predetermined time period.

6. The working machine according to claim 1, wherein in the rotation speed limitation mode, the controller prevents the engine from rotating at a rotation speed which is higher than the clutch-in rotation speed by appropriately causing a misfire cycle in the engine.

7. The working machine according to claim 6, wherein the controller performs advance angle control at igniting of an ignition device of the engine.

8. The working machine according to claim 1, wherein the operator's operation of moving the throttle valve to the fully-closed position includes an operation of actuating and then returning a throttle lever.

* * * * *